(12) United States Patent
Haupt et al.

(10) Patent No.: US 8,403,806 B2
(45) Date of Patent: Mar. 26, 2013

(54) OIL PUMP FOR AN AUTOMATIC TRANSMISSION AND CONTROL METHOD THERETO

(75) Inventors: Josef Haupt, Tettnang (DE); Christian Popp, Kressbronn (DE); Thilo Schmidt, Meckenbeuren (DE); Georg Gierer, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 398 days.

(21) Appl. No.: 12/836,750

(22) Filed: Jul. 15, 2010

(65) Prior Publication Data
US 2011/0027105 A1 Feb. 3, 2011

(30) Foreign Application Priority Data

Jul. 30, 2009 (DE) .......... 10 2009 028 120
Jan. 27, 2010 (DE) .......... 10 2010 001 259

(51) Int. Cl.
F16H 37/06 (2006.01)
(52) U.S. Cl. ........................ 475/311
(58) Field of Classification Search ......... 475/311, 475/312, 314
See application file for complete search history.

(56) References Cited

U.S. PATENT DOCUMENTS

| | | | |
|---|---|---|---|
| 5,669,842 A | 9/1997 | Schmidt | |
| 2005/0175484 A1* | 8/2005 | Yasui | 417/423.6 |
| 2006/0160653 A1* | 7/2006 | Radinger et al. | 475/314 |
| 2009/0048065 A1 | 2/2009 | Borntrager | |

FOREIGN PATENT DOCUMENTS

| | | |
|---|---|---|
| DE | 38 12 412 A1 | 10/1989 |
| DE | 197 05 957 C1 | 4/1998 |
| DE | 199 23 316 A1 | 11/2000 |
| DE | 102 49 557 A1 | 5/2004 |
| DE | 103 11 270 A1 | 9/2004 |
| DE | 103 29 215 A1 | 1/2005 |
| DE | 10 2007 039 083 A1 | 2/2009 |
| DE | 10 2007 043 737 A1 | 3/2009 |

OTHER PUBLICATIONS

German Office Action corresponding to to DE 10 2010 001 259.9 dated Jun. 20, 2012. Translation to follow.

* cited by examiner

Primary Examiner — Edwin A Young
(74) Attorney, Agent, or Firm — Davis & Bujold, PLLC

(57) ABSTRACT

A transmission oil pump for an automatic transmission of a motor vehicle. The speed of the oil pump can be shifted by a transmission (2), that is arranged between the drive motor of the motor vehicle and the transmission oil pump, to a fast-running mode or a slow-running mode so that the oil pump can be operated at two different speed levels.

11 Claims, 10 Drawing Sheets

| DRIVE INPUT | RING GEAR | RING GEAR | CARRIER | SUN | CARRIER | SUN | RING GEAR | |
|---|---|---|---|---|---|---|---|---|
| DRIVE OUTPUT | CARRIER | SUN | RING GEAR | CARRIER | SUN | RING GEAR | SUN | CARRIER | |
| FIXED | SUN | CARRIER | SUN | RING GEAR | SUN | RING GEAR | CARRIER | |
| DRIVE INPUT SPEED FACTOR | 1 | 1 | 1 | 1 | 1 | 1 | | CALCULATION EXAMPLE: FIXED TRANSMISSION RATIO -2 |
| DRIVE INPUT SPEED FACTOR | 0.67 | 1.5 | 0.33 | 3 | -2 | -0.5 | |
| FREE WHEEL POSSIBLE | | USEFUL DESIGNS | | | | | NOT USEFUL OF ROTATION DIRECTION REVERSAL | |

Fig. 10

OIL PUMP FOR AN AUTOMATIC TRANSMISSION AND CONTROL METHOD THERETO

This application claims priority from German patent application serial no. 10 2009 028 120.7 filed Jul. 30, 2009 and German patent application serial no. 10 2010 001 259.9 filed Jan. 27, 2010.

FIELD OF THE INVENTION

The invention concerns a transmission oil pump for an automatic transmission of a motor vehicle. In addition, the invention relates to a method for operating the transmission oil pump according to the invention.

BACKGROUND OF THE INVENTION

Nowadays, increasingly strict requirements apply to automatic transmissions with electro-hydraulic control systems in relation to reducing fuel consumption and exhaust emissions, while at the same time maintaining spontaneity and comfort. In addition, the manufacturing and assembly costs of automatic transmissions should be reduced. In this respect the pump systems needed for the operation of automatic transmissions are an important factor in relation to fuel consumption and exhaust emissions; furthermore, the pump systems known from the prior art have disadvantages relating to structural space occupation, and electrically powered pumps burden the on-board voltage of the vehicle to a disadvantageous extent.

From the prior art, transmission oil pumps are known, which are driven by the vehicle's internal combustion engine and/or by an electric machine of the vehicle. In addition pump systems are known, which have two pumps driven by the internal combustion engine or an electric machine. Furthermore, displacement pumps, two- or multi-flow pump designs and pumps combined with a pressure reservoir are known.

From DE 19705957 C1 by the present applicant a mechanically driven transmission oil pump arranged with its axis parallel to the transmission input shaft is known, between which and a drive element is arranged a pump clutch formed as a liquid crystal clutch with a liquid crystal clutch control system, whose controllable slip makes it possible to vary the pump driving speed.

From DE 3812412 A1 a pump drive system is known, with at least one constant pump and a planetary transmission with variable transmission ratio arranged between the pump and two working machines that drive the pump, such that the pump is connected to the drive output side of the planetary transmission and the other two shafts of the planetary transmission are connected to a first working machine, in the form of an internal combustion engine, and to a second working machine, in the form of an electric motor or a second pump, in such manner that by regulating the power of the two working machines the pump speed of the main pump can be varied according to need.

In this case, owing to the power branching in the planetary transmission there is at all times a speed-related coupling between all the components, so that the electrical drive branch cannot drive the pump independently of the mechanical drive branch; accordingly, the planetary transmission does not work as a two-gear transmission.

Moreover, from U.S. Pat. No. 5,669,842 an electro-mechanical hybrid drive is known, which comprises an electrical energy and storage source, a first motor/generator, a second motor/generator, control means for connecting the energy and storage source selectively to the first and the second motor/generators in order to control their respective operation, an internal combustion engine with an idling speed, a planetary gear assembly with a first element in driving connection with the first motor/generator, and a second element in driving connection with the second motor/generator, and a hydraulically actuated clutch which can be brought selectively into engagement in order to connect the drive machine with a third planetary transmission element of the planetary gear assembly. In this case it is provided that the third element of the planetary gear assembly is in driving connection with a number of driveshafts for auxiliary devices, one of which is in driving connection with a hydraulic energy source, so that the first and second motor/generators can be operated by the planetary gear assembly to actuate the hydraulic energy source and to control the speeds of the first and second element and thereby to rotate the third element of the planetary gear assembly at a speed which is proportional to the idling speed when the clutch is disengaged, so as to establish selective engagement of the clutch at a speed synchronous with the idling speed.

In the context of DE 10311270 A1 a hybrid drive with a pump is known, which is driven by an electric motor via a transmission with constant transmission ratio.

Furthermore, from DE 102007039083 A1 by the present applicant an axis-parallel transmission oil pump with a planetary transmission connected upstream in the force flow is known, the carrier of the planetary transmission being in active connection with the converter pump impeller or with the motor shaft and its ring gear with the converter turbine wheel or the transmission input shaft, such that a freewheel that can freely roll during thrust operation is provided between the ring gear and the transmission housing. In this case the drive input speed of the pump is adjusted as a function of a pump speed of the torque converter, which corresponds to the speed of the vehicle's drive aggregate, and as a function of a turbine speed of the torque converter, in such manner that when the pump speed of the torque converter is higher than its turbine speed, the pump is driven at a drive speed higher than the speed of the drive aggregate, and when the turbine speed of the torque converter approaches its pump speed, the excess of the pump's drive speed compared with the speed of the drive aggregate is reduced.

SUMMARY OF THE INVENTION

The purpose of the present invention is to indicate a transmission oil pump for an automatic transmission, which results in reduced consumption and exhaust gas emissions and which can be integrated in the transmission with a neutral or lower structural space requirement. In addition, the pump according to the invention should substantially reduce cavitation effects that can occur in hydraulic pumps at high speeds. A further objective of the invention is to indicate a method for operating the transmission oil pump according to the invention.

Accordingly, a hydraulic transmission oil pump is proposed, whose speed can be changed to fast or to slow by a shiftable gear system arranged in the force flow between the drive motor of the motor vehicle and the transmission oil pump, so that the transmission oil pump can be operated at two different speed levels.

According to an embodiment of the invention the shiftable gear system is made as a simple planetary transmission which can be shifted by means of a freewheel and a shifting element. The freewheel is preferably connected between the element of the planetary transmission which is connected neither to the transmission oil pump nor to the drive motor of the motor vehicle or the converter hub, and a housing, preferably the housing of the transmission oil pump.

Preferably, the shifting element can be controlled strategically in such manner that in the lower and upper speed ranges the greatest possible advantages in relation to exhaust gas emissions and fuel consumption can be achieved. For this, according to the invention the transmission oil pump can be driven not during shifting operations and in the upper drive speed range at a low speed; during shifting operations in the lower speed range the speed of the transmission oil pump is shifted by means of the shiftable gear system to a high speed, so that as large a delivery volume of fluid as possible can be provided for the hydraulic system, which corresponds to the design of the automatic transmission.

The transmission ratio change of the speed of the transmission oil pump or the basic design of the transmission oil pump are chosen such that at a small delivery volume in cyclic operation (i.e. as a rule at speeds in the range of 900 to 1200 r/min) it is only capable of covering the basic leakage at a low system pressure and providing a minimum quantity of cooling and lubrication oil. A typical value for the delivery volume is then around 6 to 8 l/min. At higher delivery volumes the transmission oil pump is intended to cover the dynamic requirements of the transmission, for example when engaging gears or during rolling shifts; in such cases the high delivery volume is of the order of 13 to 18 l/min.

According to a particularly advantageous embodiment of the invention, the transmission can be shifted electromagnetically, the shift, i.e. actuation of the shifting element, taking place by virtue of a shifting pressure from the hydraulic control unit of the vehicle's transmission, such that a NC magnetic valve can be used for this purpose, which is closed in the de-energized condition, whereby the speed of the transmission oil pump when the valve is de-energized is increased; in the framework of an emergency program it can be provided that the pump speed is reduced.

Alternatively a NO magnetic value can be used, which is open in the de-energized condition, by means of which the speed of the transmission oil pump can be increased when the value is energized; in the context of an emergency program it can be provided that the speed of the pump is increased.

In addition, electro-mechanical locking mechanisms can be used to control the shifting element.

BRIEF DESCRIPTION OF THE DRAWINGS

Below, examples of the invention are explained in greater detail with reference to the attached figures, which show:

FIG. 10: Example of a tabular summary of possible embodiments of the connection of a transmission oil pump according to the invention.

DETAILED DESCRIPTION OF THE PREFERRED EMBODIMENTS

Figure 1:
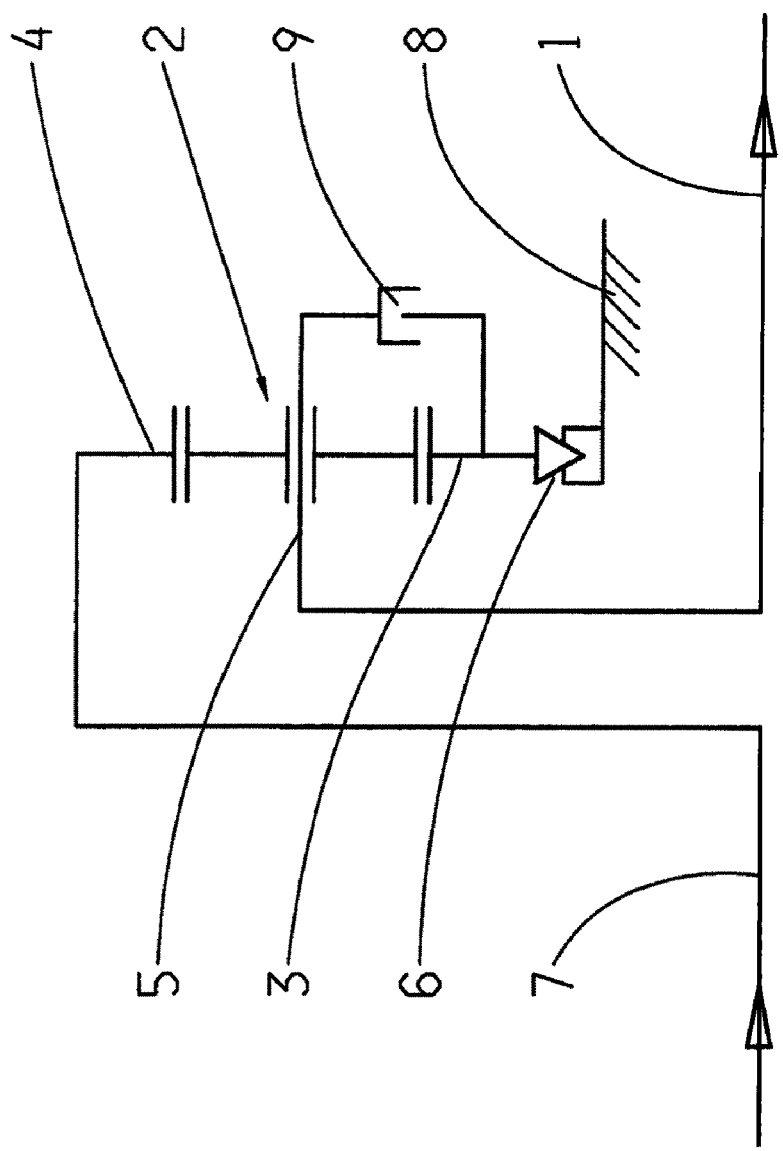
FIG. 1: Schematic view of a transmission oil pump connected in accordance with a first embodiment of the invention.

According to the invention, the transmission oil pump of a shiftable gear system, that is arranged in the force flow between the drive motor of the motor vehicle and the transmission oil pump, can be shifted from fast-running to slow-running, so that the transmission oil pump can be operated at two different speed levels. Preferably, the shiftable gear system is made as a simple planetary transmission, as illustrated in FIGS. 1 to 6.

FIGS. 1 to 9 represent a planetary transmission 2 comprising a sun gear 3, a carrier 5 and a ring gear 4. Furthermore, in FIGS. 1 to 9 the drive input of the planetary transmission, which preferably consists of a chain in active connection with the converter hub (not shown), is indexed 7 and the drive output of the planetary transmission 2 connected to the transmission oil pump is indexed 1. In addition, in FIGS. 1 to 9 the housing of the transmission oil pump is indexed 8. As an alternative to the chain drive, the planetary transmission 2 can be driven by a gearwheel stage. In the case when the automatic transmission has no converter, the ring gear 4 can be connected via a gearwheel stage or a chain to the motor shaft. Advantageously, in place of the drive pinion provided as a rule according to the prior art, the planetary transmission 2 is accommodated in a fitting-space-neutral configuration.

In the example shown in FIG. 1 the speed of the transmission oil pump can be switched to slow-running by means of the shiftable planetary transmission 2, whereby on its drive input side the transmission oil pump is connected to the carrier 5 of the planetary transmission 2 and the planetary transmission 2 is driven via the ring gear 4 and a chain 7 in active connection with the converter hub (not shown) and the ring gear 4.

Moreover, the carrier 5 of the planetary transmission 2 can be releasably connected to the sun gear 3 of the planetary transmission 2 by a clutch 9. When this clutch 9 is disengaged the transmission ratio of the drive output speed of the planetary transmission 2 and hence the speed of the transmission oil pump are slow, whereas when the clutch 9 is engaged the planetary transmission 2 is blocked and no transmission ratio of the drive output speed is produced. In the figure, the necessary freewheel connected between the sun gear 3 and the housing 8 of the transmission oil pump is indexed 6. For example, the transmission ratio of the drive output speed of the planetary transmission 2 and hence the slow speed of the transmission oil pump is 0.60 when the constant transmission ratio of the planetary transmission 2 is equal to minus 1.5, and 0.71 when the constant transmission ratio of the planetary transmission 2 is equal to minus 2.5.

Figure 2:
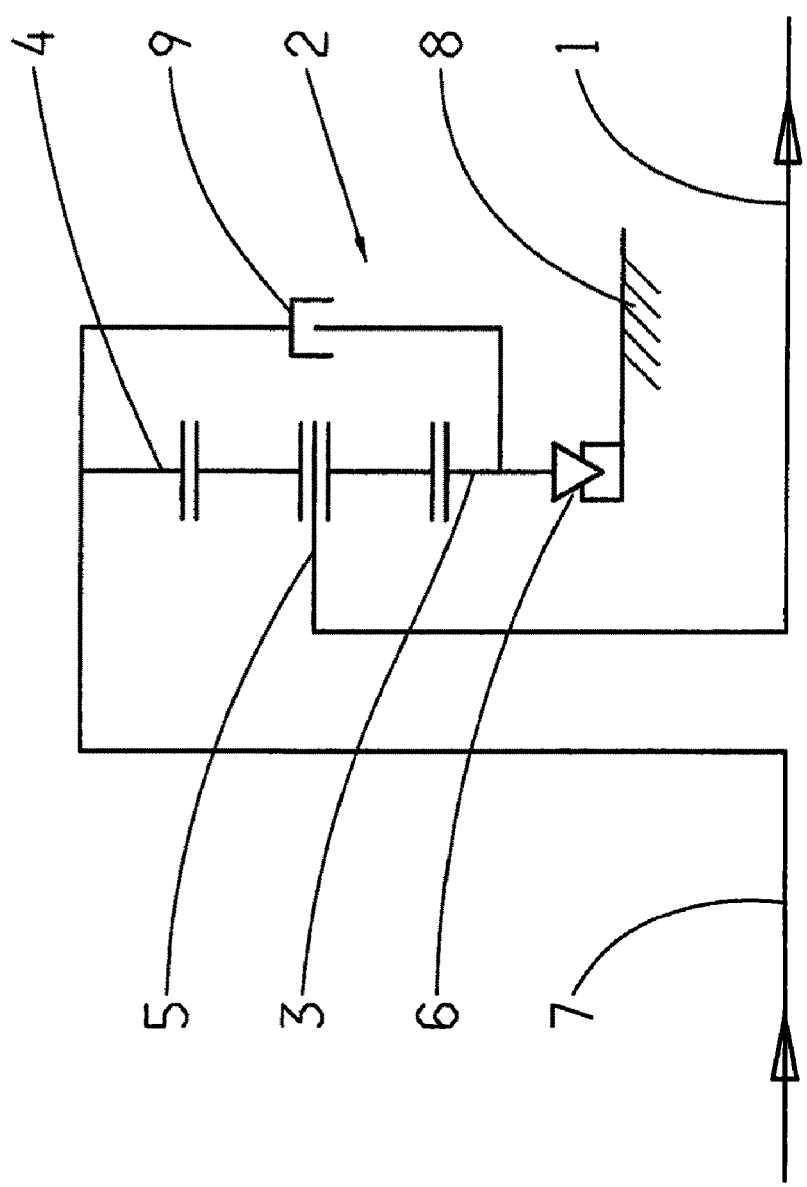
FIG. 2: Schematic view of a transmission oil pump connected in accordance with a second embodiment of the invention.

According to another embodiment of the invention, the embodiment illustrated with reference to FIG. 1 can be modified in that the clutch 9, for blocking the planetary transmission 2 so that no transmission ratio is produced, connects the sun gear 3 releasably to the ring gear 4, as illustrated in FIG. 2. In this case too, when the clutch 9 is disengaged a slow-running transmission ratio of the speed of the transmission oil pump is produced.

Figure 3:
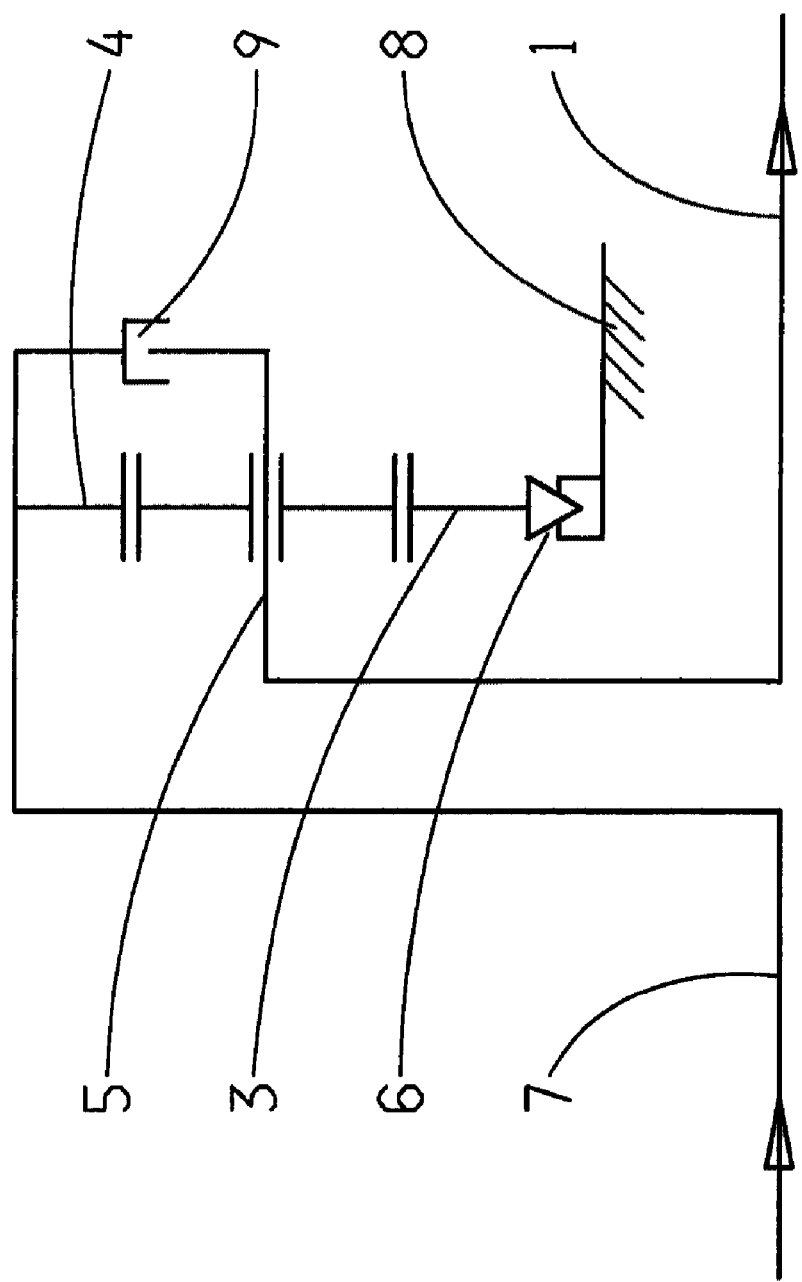
FIG. 3: Schematic view of a transmission oil pump connected in accordance with a third embodiment of the invention.

The embodiment shown in FIG. 3 differs from the embodiment in FIG. 1 in that the clutch 9 for blocking the planetary transmission 2, whereby no transmission ratio is produced, connects the carrier 5 releasably to the ring gear 4; when the clutch 9 is disengaged, a slow-running transmission ratio of the speed of the transmission oil pump is produced.

Figure 4:
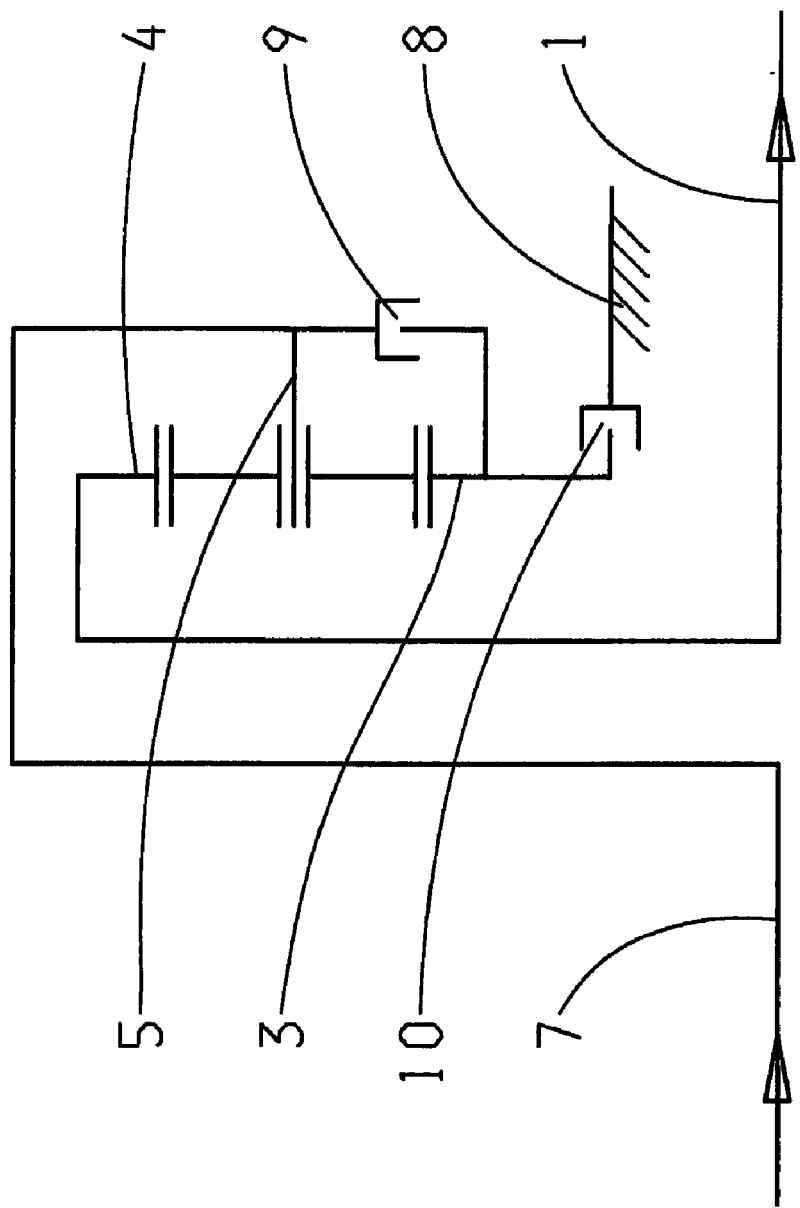
FIG. 4: Schematic view of a transmission oil pump connected in accordance with a fourth embodiment of the invention.

In the embodiment shown in FIG. 4, on its drive input side the transmission oil pump is connected to the ring gear 4 of the planetary transmission 2 and the planetary transmission 2 is driven via the carrier 5 of the planetary transmission 2 and preferably via a chain actively connected to the converter hub or the motor shaft and to the carrier 5, although instead of the chain a gearwheel stage can be provided.

In this case, according to the invention the sun gear 3 can be coupled by a brake 10 to the housing 8 of the transmission oil pump and the sun gear 3 can be releasably connected by a clutch 9 to the carrier 5, so that when the brake 10 is open the planetary transmission 2 is blocked. According to the invention, when the clutch 9 is disengaged and the break 10 is engaged, a fast-running transmission ratio of the speed of the transmission oil pump is produced.

Figure 5:
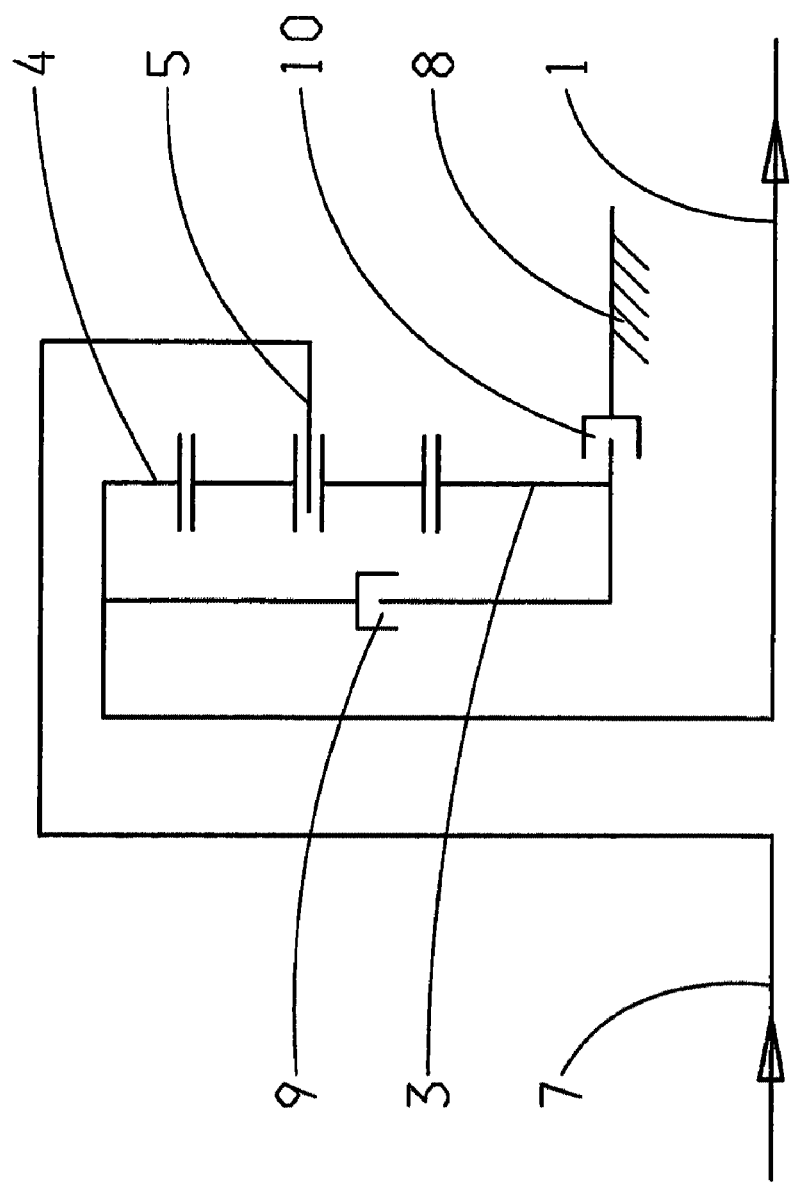
FIG. 5: Schematic view of a transmission oil pump connected in accordance with a fifth embodiment of the invention.
Figure 6:
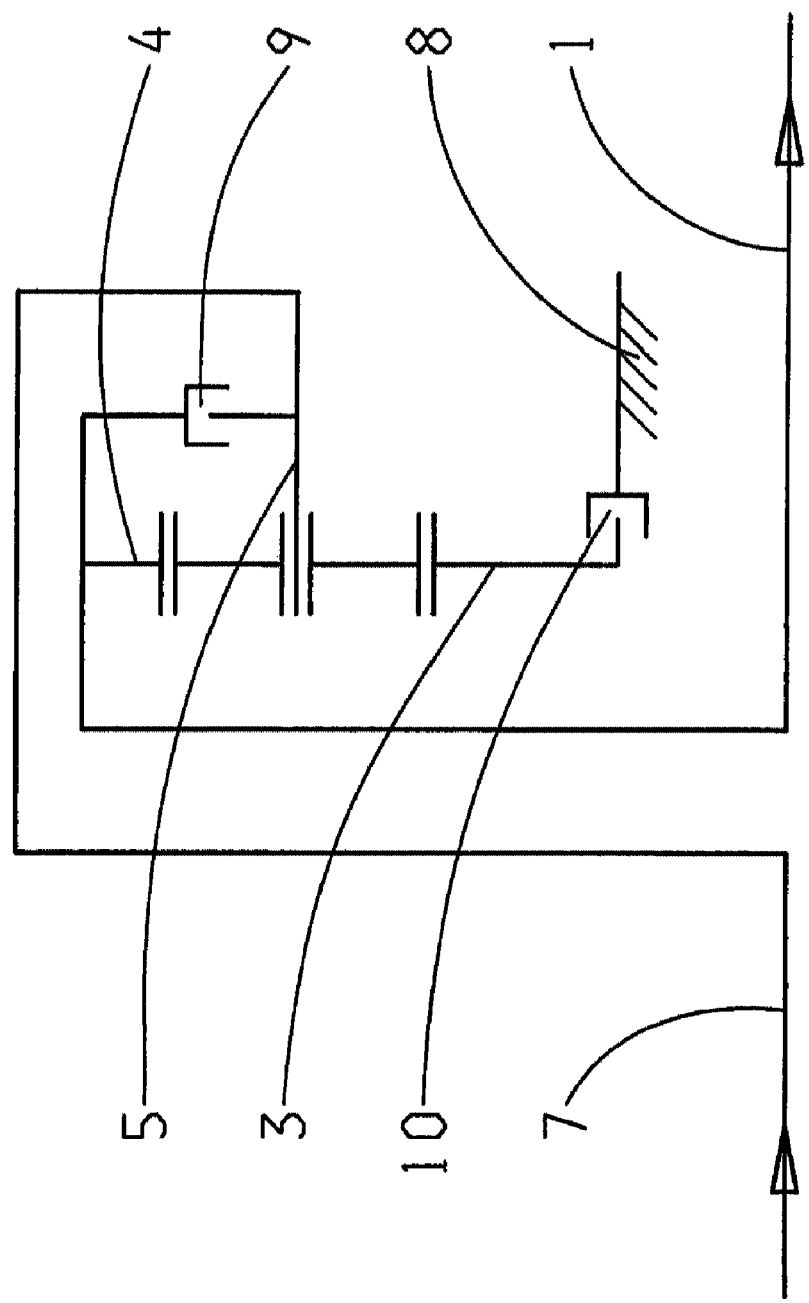
FIG. 6: Schematic view of a transmission oil pump connected in accordance with a sixth embodiment of the invention.

Alternatively to the releasable connection of the sun gear 3 to the carrier 5 for blocking the planetary transmission 2 by means of the clutch 9, a releasable connection can be produced by the clutch 9 between the sun gear 3 and the ring gear 4, as illustrated in FIG. 5. Furthermore, the planetary transmission 2 can be blocked by a releasable connection of the carrier 5 to the ring gear 4 produced by the clutch 9; this embodiment is the object of FIG. 6.

In the example embodiments described, the sun gear can be coupled to the housing 8 of the transmission oil pump; alternatively, the sun gear can be coupled to some other housing of the transmission.

According to further embodiments of the invention the drive input to the transmission oil pump can take place via the carrier, and in that case the drive input to the planetary transmission takes place via the sun gear and, to produce a slow-running transmission ratio, the ring gear is coupled to the housing by means of a freewheel. Embodiments of this type are illustrated in FIGS. 7, 8 and 9.

Figure 7:
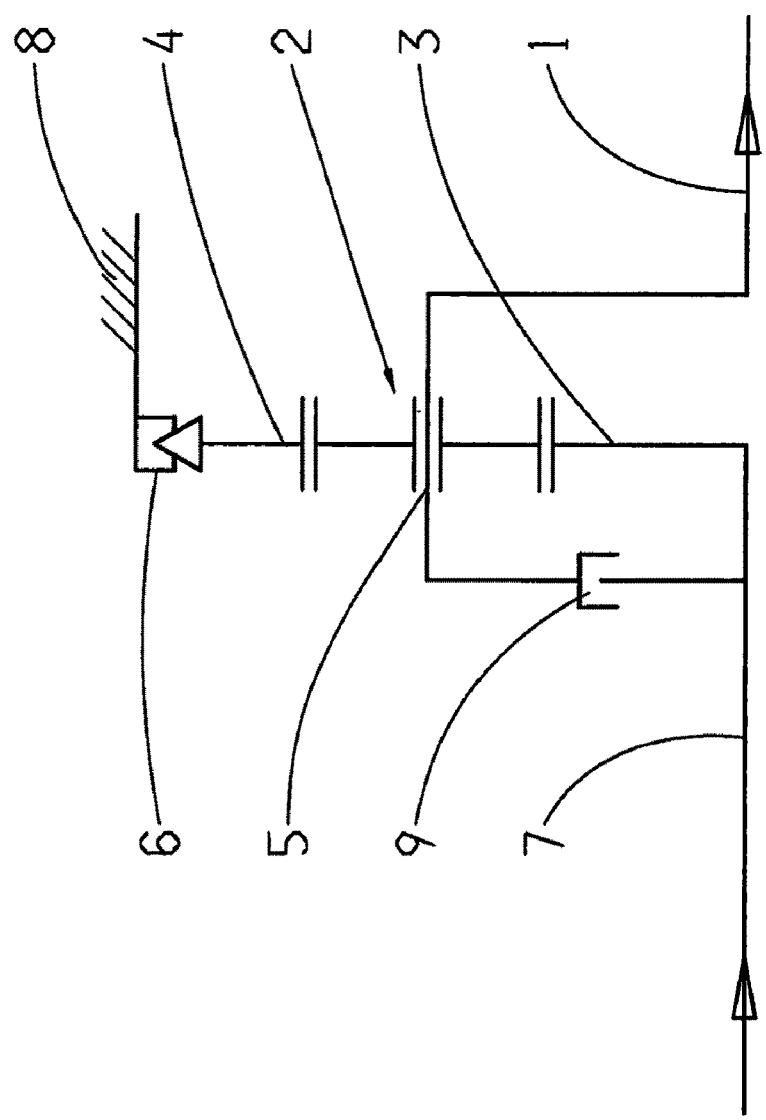
FIG. 7: Schematic view of a transmission oil pump connected in accordance with a seventh embodiment of the invention.

In the example shown in FIG. 7, on its drive input side the transmission oil pump is connected to the carrier 5 of the shiftable planetary transmission 2 and a freewheel 6 is connected between the ring gear 4 of the planetary transmission 2 and the housing 8. Furthermore, between the sun gear 3 and the carrier 5 of the shiftable planetary transmission 2 a clutch 9 is provided for connecting the sun gear 3 releasably to the carrier 5, so that when the clutch 9 is disengaged a slow-running transmission ratio of the drive output speed of the planetary transmission 2 and hence of the speed of the transmission oil pump can be produced; when the clutch 9 is engaged the planetary transmission 2 is blocked and no transmission ratio of the drive output speed is produced.

For example, if the constant transmission ratio of the planetary transmission 2 is equal to minus 1.5, when the clutch 9 is disengaged a slow-running step-down with transmission ratio 0.4 is produced.

Figure 8:
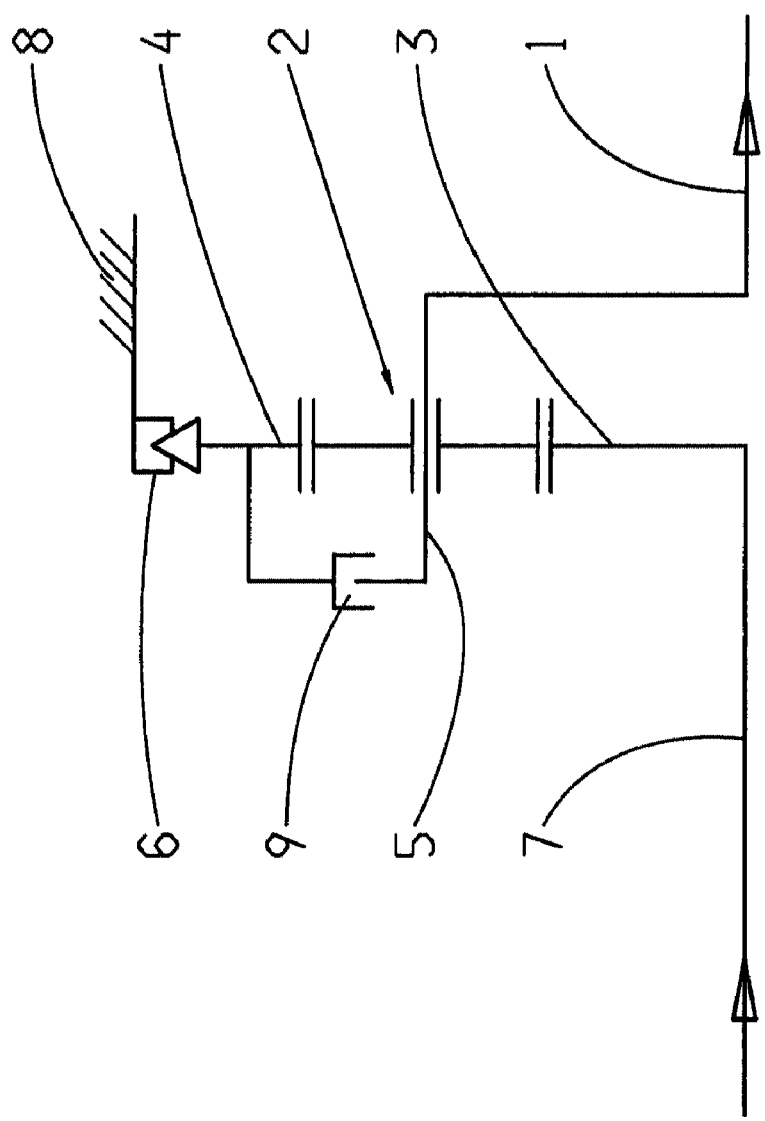
FIG. 8: Schematic view of a transmission oil pump connected in accordance with an eighth embodiment of the invention.
Figure 9:
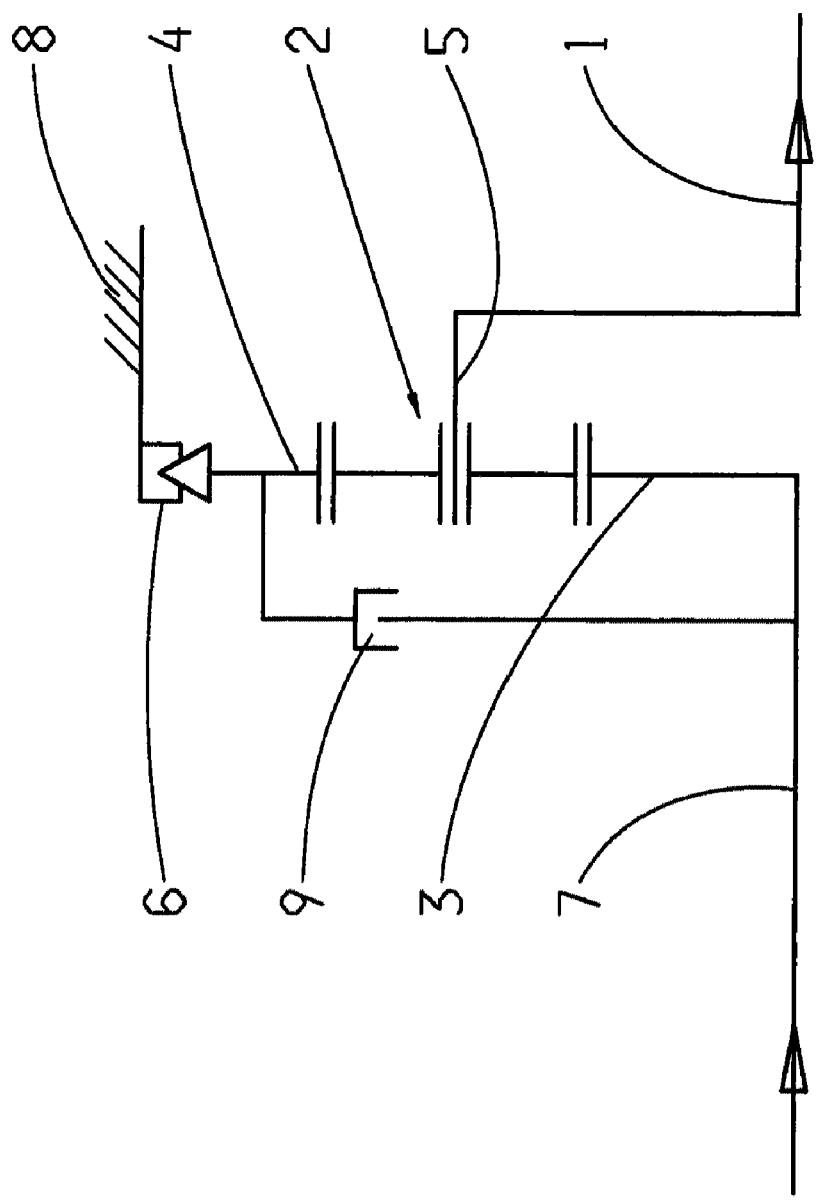
FIG. 9: Schematic view of a transmission oil pump connected in accordance with a ninth embodiment of the invention.

Alternatively to the releasable connection of the sun gear 3 to the carrier 5 by the clutch 9, in order to block the planetary transmission 2, the clutch 9 can also form a releasable connection between the carrier 5 and the ring gear 4 of the planetary transmission 2, as illustrated in FIG. 8. In addition, as in the embodiment of the invention shown in FIG. 9, the planetary transmission 2 can be blocked by a releasable connection formed by the clutch 9 between the sun gear 3 and the ring 4.

Furthermore, the drive input to the transmission oil pump can take place via the sun gear, and in that case the drive input to the planetary transmission takes place via its carrier and, to produce a slow-running transmission ratio, the ring gear is coupled to the housing by means of a brake.

The variant forms described for producing the drive input to and drive output from the planetary transmission, as well as two other variants which, disadvantageously, result in a rotation direction reversal, are summarized in the self-explanatory table shown as FIG. 10. The table also shows the transmission ratios of the speed of the transmission oil pump that can be produced in each case when the fixed transmission ratio of the planetary transmission is equal to minus 2.

Indexes

1 Drive output of the planetary transmission
2 Planetary transmission
3 Sun gear
4 Ring gear
5 Carrier
6 Freewheel
7 Drive input of the planetary transmission
8 Pump housing
9 Clutch
10 Brake

The invention claimed is:

1. A transmission oil pump for an automatic transmission of a motor vehicle, the transmission oil pump being shiftable between a fast-running and a slow-running operation by a shiftable transmission (2) that is arranged, in a force flow, between a drive motor of the motor vehicle and the transmission oil pump such that the transmission oil pump is operable at two different speed levels;
   the shiftable transmission (2) is a simple planetary transmission which is shiftable by a clutch (9) and one of a freewheel (6) and a brake (10); and
   a drive input side of the transmission oil pump is connected to a carrier (5) of the planetary transmission (2) such that the planetary transmission (2) is driven via a ring gear (4), and a clutch (9) is provided between and releasably couples one of the carrier (5) and the ring gear (4), the carrier (5) and a sun gear (3) and the ring gear (4) and the sun gear (3), and a freewheel (6) is connected between the sun gear (3) and a housing (8) such that when the clutch (9) is disengaged, a transmission ratio of the drive output speed of the planetary transmission (2) is produced and the transmission oil pump is shifted to the slow-running operation, whereas when the clutch (9) is engaged, the planetary transmission (2) is blocked so as to avoid producing any transmission ratio for the drive output.

2. The transmission oil pump for the automatic transmission of the motor vehicle according to claim 1, wherein the transmission (2) is shifted electromagnetically, and a shifting element is actuated by a shifting pressure from the hydraulic control unit of the vehicle transmission.

3. The transmission oil pump for the automatic transmission of the motor vehicle according to claim 2, wherein a NC magnetic valve actuates the shifting element and the NC magnetic valve is closed in a de-energized condition, and the transmission oil pump operates at an increased speed when the NC magnetic valve is de-energized.

4. The transmission oil pump for the automatic transmission of the motor vehicle according to claim 2, wherein a NO magnetic valve actuates the shifting element and the NO magnetic valve is open in a de-energized condition, and the transmission oil pump operates at an increased speed when the NO magnetic valve is energized.

5. The transmission oil pump for the automatic transmission of the motor vehicle according to claim 1, wherein the transmission ratio change of the speed of the transmission oil pump and a basic design of the transmission oil pump are chosen such that with a small delivery volume during a cyclic operation at the slow-running operation, the transmission oil pump compensates for a basic leakage at a low system pressure and delivers a minimum quantity of cooling oil and lubricating oil, while with a high delivery volume, the transmission oil pump fulfills dynamic requirements of the automatic transmission.

6. A transmission oil pump for an automatic transmission of a motor vehicle, the transmission oil pump being shiftable between a fast-running and a slow-running operation by a shiftable transmission (2) that is arranged, in a force flow, between a drive motor of the motor vehicle and the transmission oil pump such that the transmission oil pump is operable at two different speed levels;
the shiftable transmission (2) is a simple planetary transmission which is shiftable by a clutch (9) and one of a freewheel (6) and a brake (10); and
a drive input side of the transmission oil pump is connected to a ring gear (4) of the planetary transmission (2), the planetary transmission (2) is driven via a carrier (5), and a sun gear (3) of the planetary transmission (2) is coupled, by a brake (10), to a housing (8), and a clutch (9) is arranged between and releasably couples one of the carrier (5) and the ring gear (4), and the ring gear (4) and the sun gear (3) so that, when the sun gear (3) is connected to the housing (8) by engaging the brake (10), a transmission ratio of the drive output speed of the planetary transmission (2) is produced and hence the speed level of the transmission oil pump is shifted to the fast-running operation, and when the brake (10) is disengaged and the clutch (9) is engaged, the planetary transmission (2) runs as a block so as to avoid producing any transmission ratio of the drive output speed.

7. The transmission oil pump for the automatic transmission of the motor vehicle according to claim 6, wherein the transmission (2) is shifted electromagnetically, and a shifting element is actuated by a shifting pressure from the hydraulic control unit of the vehicle transmission.

8. The transmission oil pump for the automatic transmission of the motor vehicle according to claim 7, wherein a NC magnetic valve actuates the shifting element and the NC magnetic valve is closed in a de-energized condition, and the transmission oil pump operates at an increased speed when the NC magnetic valve is de-energized.

9. The transmission oil pump for the automatic transmission of the motor vehicle according to claim 7, wherein a NO magnetic valve actuates the shifting element and the NO magnetic valve is open in a de-energized condition, and the transmission oil pump operates at an increased speed when the NO magnetic valve is energized.

10. The transmission oil pump for the automatic transmission of the motor vehicle according to claim 6, wherein the transmission ratio change of the speed of the transmission oil pump and a basic design of the transmission oil pump are chosen such that with a small delivery volume during a cyclic operation at the slow-running operation, the transmission oil pump compensates for a basic leakage at a low system pressure and delivers a minimum quantity of cooling oil and lubricating oil, while with a high delivery volume, the transmission oil pump fulfills dynamic requirements of the automatic transmission.

11. A method for operating a transmission oil pump for an automatic transmission of a motor vehicle, the transmission oil pump being shiftable between a fast-running and a slow-running operation by a shiftable transmission (2) that is arranged in a force flow between a drive motor of the motor vehicle and the transmission oil pump such that the transmission oil pump is operable at two different speed levels, the method comprising the steps of:
driving the transmission oil pump at a low speed when no shift operation is taking place and the shiftable transmission (2) is operated in an upper speed range; and shifting the transmission oil pump to operate at a high speed by operating the shiftable gear system (2) to a lower speed range so that as large a delivery quantity as possible is supplied to a hydraulic system which corresponds to a design of the automatic transmission;
connecting a drive input side of the transmission oil pump to a carrier (5) of the planetary transmission (2) such that the planetary transmission (2) is driven via a ring gear (4), and providing a clutch (9) between and for releasably coupling one of the carrier (5) and the ring gear (4), the carrier (5) and a sun gear (3) and the ring gear (4) and the sun gear (3); and
connecting a freewheel (6) between the sun gear (3) and a housing (8) such that when the clutch (9) is disengaged, a transmission ratio of the drive output speed of the planetary transmission (2) is produced and the transmission oil pump is shifted to the slow-running operation, and when the clutch (9) is engaged, the planetary transmission (2) is blocked so as to prevent producing any transmission ratio for the drive output.

* * * * *